United States Patent [19]

Sakai et al.

[11] Patent Number: 4,691,255
[45] Date of Patent: Sep. 1, 1987

[54] POWER SAVING CIRCUIT ARRANGEMENT FOR DATA TRANSFER APPARATUS WITH A DISKLIKE RECORD MEDIUM

[75] Inventors: Yoshiaki Sakai, Higashikurume; Hiroshi Tsuyuguchi, Tokyo, both of Japan

[73] Assignee: Teac Corporation, Tokyo, Japan

[21] Appl. No.: 699,084

[22] Filed: Feb. 7, 1985

[30] Foreign Application Priority Data

Feb. 8, 1984 [JP] Japan .................................. 59-21301

[51] Int. Cl.$^4$ ............................................ G11B 19/02
[52] U.S. Cl. ........................................ 360/69; 360/97; 318/345 B
[58] Field of Search ................... 360/69, 137, 78, 75, 360/73, 97–99; 318/345 B, 390, 685, 391, 696, 403; 361/24, 28, 29, 31, 58

[56] References Cited

U.S. PATENT DOCUMENTS 4,388,572  6/1983  Rosenfeldt .................... 318/345 B

FOREIGN PATENT DOCUMENTS

| 56-94986 | 7/1981 | Japan | 361/31 |
| 56-134357 | 10/1981 | Japan | 360/99 |
| 57-164473 | 10/1982 | Japan | 360/69 |
| 58-29177 | 2/1983 | Japan | 360/97 |
| 58-164062 | 9/1983 | Japan | 360/97 |
| 58-211359 | 12/1983 | Japan | 360/137 |

Primary Examiner—Raymond F. Cardillo
Assistant Examiner—Steven R. Garland
Attorney, Agent, or Firm—Woodcock Washburn Kurtz Mackiewicz & Norris

[57] ABSTRACT

A magnetic disk drive is disclosed which has a disk drive motor for imparting rotation to a magnetic disk, and a head transport motor for transporting a transducer head or heads radially of the magnetic disk for track to track accessing. The disk drive motor and the head transport motor are fed from a common direct current supply terminal via first and second switching transistors, respectively, which independently control power delivery to the two motors for effectively saving power. A voltage regulating capacitor is connected only between ground and the output line of the first switching transistor for the disk drive motor. In order to prevent the flow of a surge current due to the voltage regulating capacitor upon conduction of the first switching transistor, a conduction retarder is provided which causes a gradual conduction through the first switching transistor in response to an actuating signal from host equipment controlling the disk drive. The conduction retarder takes the form of a capacitor connected between the collector and base of the first switching transistor in one embodiment of the invention, and of a time constant circuit connected between the host equipment and the base of the first switching transistor in another embodiment.

5 Claims, 3 Drawing Figures

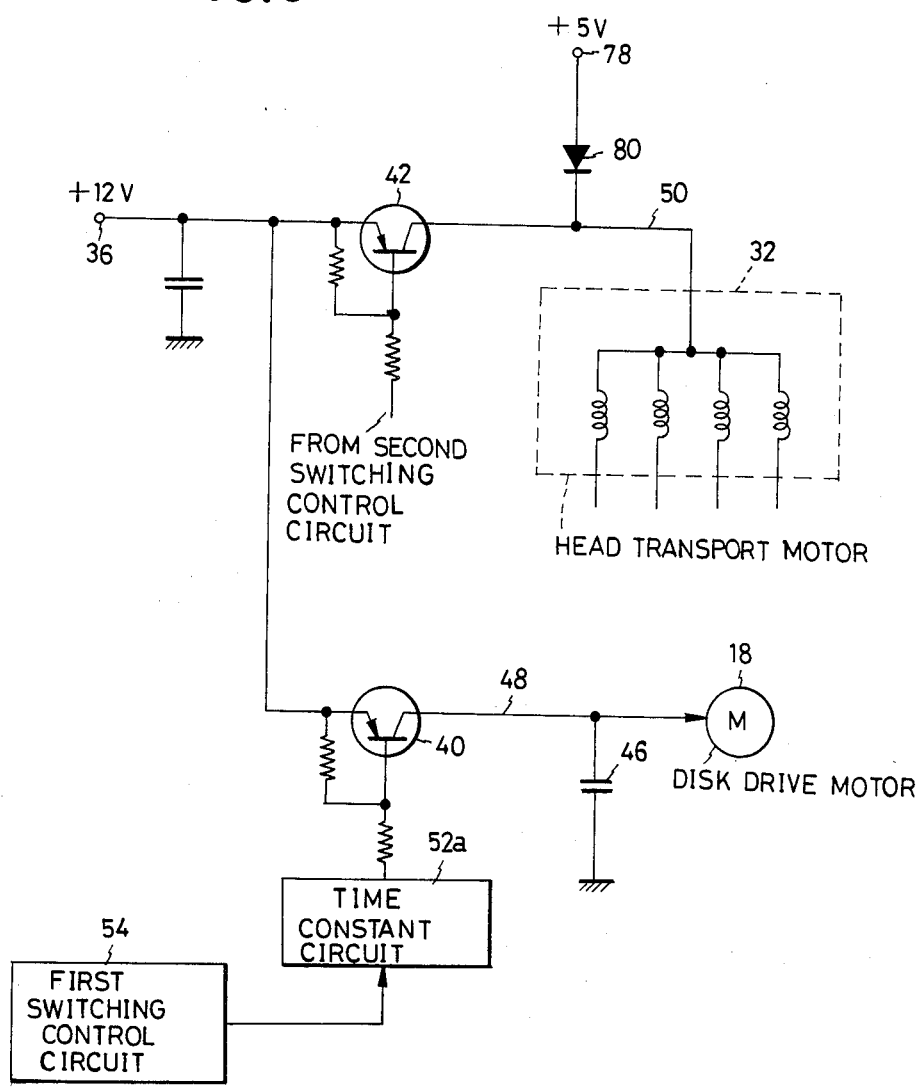

POWER SAVING CIRCUIT ARRANGEMENT FOR DATA TRANSFER APPARATUS WITH A DISKLIKE RECORD MEDIUM

BACKGROUND OF THE INVENTION

Our invention relates to an apparatus for data transfer with a disklike record medium such as, typically, a flexible magnetic disk commonly known as a floppy disk. More particularly, our invention deals with such an apparatus including a floppy disk drive (FDD) under the control of host equipment normally comprising a central processor unit (CPU) and an FDD controller.

As is well known, the FDD is not a self contained unit; rather, one FDD or a set of FDDs are coupled to, and controlled by, host equipment to make up a data processing system. Normally, each FDD has no power switch of its own but is electrically turned on and off by a power switch provided to the host equipment. When the host equipment is switched on, therefore, so is the FDD, even though the latter may not actually perform the data transfer function for which it is intended during all the period when the system power switch is held closed. This of course incurs a substantial waste of power.

Prior art attempts at reducing such waste of power in FDDs are seen in U.S. patent applications Ser. Nos. 634,318, now abandoned, and 634,320, both filed July 25, 1984, and Ser. No. 642,050, filed Aug. 17, 1984, all by Tsuyuguchi et al. and assigned to the assignee of our present application. All these prior applications suggest to automatically switch off supply lines to some components of the FDD when their operations are not required, while the system power switch is held closed. Although these conventional solutions are satisfactory in their own ways, we believe that the saving of power should not sacrifice the response of the FDD, that is, the immediate commencement of data transfer in response to a command from the host equipment.

SUMMARY OF THE INVENTION

We have hereby succeeded in minimizing waste of power in an FDD without sacrificing its response and while assuring a stabilized delivery of supply voltage whenever it is required.

Stated broadly, our invention concerns a data transfer apparatus for use with a disklike record medium such as a flexible magnetic disk, comprising a disk drive motor for imparting rotation to the record medium, and a head transport motor for transporting a transducer head in a predetermined direction relative to the record medium so as to enable the transducer head to access data storage tracks on the record medium. A first switching transistor is connected between power supply means and the disk drive motor for the on off control of power delivery from the former to the latter, and a second switching transistor is connected between the power supply means and the head transport motor for the on off control of power delivery from the former to the latter. The operation of the first and second switching transistors are controlled respectively by first and second switching control circuits for power delivery to the disk drive motor and head transport motor as required. Connected between ground and a line connecting the first switching transistor to the disk drive motor is a voltage regulating capacitor having a capacitance greater than that between ground and a line connecting the second switching transistor to the head transport motor. A conduction retarder is further connected to the first switching transistor for causing a gradual conduction therethrough in response to the output from the first switching control circuit.

The conduction retarder can take the form of either a a capacitor connected between the collector and base of the first switching transistor, or a time constant circuit connected between the base of the first switching transistor and the first switching control circuit.

Thus, in accordance with our invention, the supply of power to the disk drive motor and to the head transport motor is controlled by respective switching transistors. The independent control of power delivery to the two motors, made possible by the two switching transistors, leads to a greater saving of power.

Our invention further features the voltage regulating capacitor connected to the output line of the first switching transistor. Were it not for the conduction retarder for the first switching transistor, such as the noted capacitor or time constant circuit, a large amount of current would suddenly rush into the voltage regulating capacitor upon conduction of the first switching transistor. No significant current surge will actually occur, however, as the conduction retarder functions to gradually reduce the conduction resistance, so to say, of the first switching transistor. Consequently, the supply line will suffer no such voltage drop as to adversely affect other loads fed from the same power supply means.

Admittedly, the provision of the voltage regulating capacitor and the conduction retarder will give rise to some delay in power delivery to the disk drive motor upon actuation of the first switching transistor by the first switching control circuit. In FDDs in general, however, it takes from 0.1 to 1.0 second for the magnetic disk to reach a normal speed of rotation upon energization of the disk drive motor, so that the slight delay in the energization of the disk drive motor is practically negligible.

The head transport motor, on the other hand, must be quicker in response, quick enough to move the transducer head or heads one track in one to 40 milliseconds following the delivery of a head transport command from the host equipment. Such quick response of the head transport motor is possible, of course, if it is constantly connected to the power supply, as has been the case heretofore. Some special measure must be taken if power is to be saved by disconnecting the head transport motor from the power supply, or by connecting the motor to another, lower voltage power supply, when its rotation is not required. Thus, in accordance with our invention summarized above, the capacitance of the output side of the second switching transistor associated with the head transport motor is made less than that of the output side of the first switching transistor, and no conduction retarder is provided to the second switching transistor, so that immediate delivery of power to the head transport motor is possible upon conduction of the second switching transistor.

The above and other features and advantages of our invention and the manner of realizing them will become more apparent, and the invention itself will best be understood, from a study of the following description and appended claims, with reference had to the attached drawings showing some preferred embodiments of our invention.

BRIEF DESCRIPTION OF THE DRAWINGS

FIG. 3 is a view similar to FIG. 2 but showing another preferred embodiment of our invention.

DESCRIPTION OF THE PREFERRED EMBODIMENTS

Figure 1:
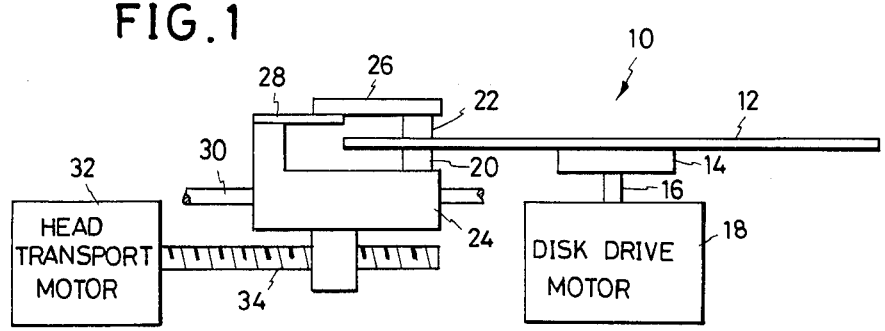
FIG. 1 is a diagrammatic representation of an FDD to which our invention finds application.

We have diagrammatically illustrated in FIG. 1 the usual construction of the FDD to which our invention is applicable, to an extent necessary for a full understanding of the invention. Generally designated 10, the FDD is for use with a flexible magnetic disk 12 employed as an example of disklike record media within the broad concepts of our invention. The magnetic disk 12 is shown mounted on a turntable 14 for joint rotation therewith. The turntable 14 is fixedly mounted directly on an output shaft 16 of a disk drive motor 18. The rotation of the disk drive motor 18 is therefore imparted directly to the turntable 14 and thence to the magnetic disk 12 replaceably mounted thereon.

Arranged for data transfer with the opposite sides of the magnetic disk 12 are a pair of magnetic transducer heads 20 and 22, as the magnetic disk is assumed to be double sided, that is, to have data written on and read from both sides thereof. Only one transducer head would of course be provided if the disk were single sided. While the lower transducer head 20 is mounted directly on a carriage 24, the upper transducer head 22 is mounted thereon via a support arm 26 and cantilever spring 28. The upper transducer head 22 is therefore movable into and out of data transfer contact with the magnetic disk 12 to allow the latter to be loaded into and unloaded from the FDD 10. The carriage 24 is reciprocably movable along a pair of guide rods 30, one seen, for transporting the pair of transducer heads 20 and 22 radially of the magnetic disk 12 to enable the heads to access the data storage tracks on the disk.

At 32 is shown a head transport motor of the stepping type for causing the stepwise travel of the carriage 24 along the guide rods 30. The head transport motor 32 is coupled to the carriage 24 via a rotary to linear converter herein shown as a lead screw 34.

The construction of the FDD 10 as so far described is conventional, and therein lies no feature of our invention. The novel concepts of our invention will appear in the following discussion of FIG. 2.

The FDD 10 is powered from a direct current supply terminal 36 of, say, 12 volts, conventionally provided with a voltage stabilizing capacitor 38. The supply terminal 36 is connected to the disk drive motor 18 via a first switching transistor 40, and to the head transport motor 32 via a second switching transistor 42. A familiar read/write circuit 44 is also connected to the supply terminal 36 via the first switching transistor 40 in this particular embodiment. As is well known, the read/write circuit 44 processes data read from, or to be written on, the magnetic disk 12 by the pair of transducer heads 20 and 22.

A voltage regulating capacitor 46 is connected between a line 48 connecting the first switching transistor 40 to the disk drive motor 18, as well as to the read/write circuit 44, and ground (or a conducting body equivalent to the earth). The voltage regulating capacitor 46 has a capacitance greater than the capacitance (either stray capacitance or the sum of stray capacitance and the capacitance of a capacitor, if any) between an output line 50 of the second switching transistor 42 and ground.

The provision of the voltage regulating capacitor 46 on the output side of the first switching transistor 40 makes it essential that what is herein termed a conduction retarder be provided to the first switching transistor. The conduction retarder takes the form of a capacitor 52 in this particular embodiment, which is connected between the collector and base of the first switching transistor 40.

A first switching control circuit 54 is connected to the base of the first switching transistor 40 for causing conduction therethrough when the disk drive motor 18 and read/write circuit 44 are to be energized from the supply terminal 36. A second switching control circuit 56 is likewise connected to the base of the second switching transistor 42 for causing conduction therethrough when the head transport motor 32 is to be energized from the supply terminal 36. Normally, both first 54 and second 56 switching control circuits form parts of host equipment 58 controlling the FDD 10.

Figure 2:
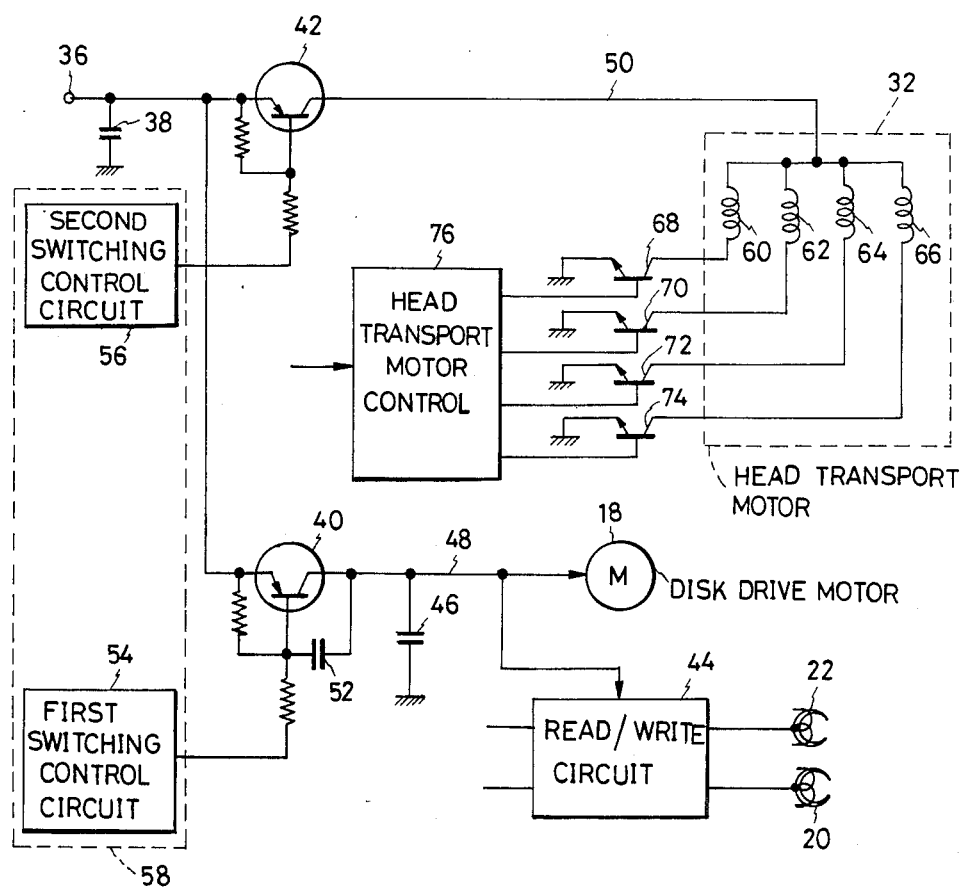
FIG. 2 is a schematic electrical diagram, partly in block diagrammatic form, of the FDD of FIG. 1, and of host equipment therefor, incorporating the novel concepts of our invention.

The head transport motor 32 is shown as a four phase stepping motor in FIG. 2 by way of example only, having first 60, second 62, third 64 and fourth 66 phase windings each having one extremity connected to the supply terminal 36 via the second switching transistor 42. The other extremities of the windings 60, 62, 64 and 66 are connected to switching transistors 68, 70, 72 and 74, respectively, and thence to ground. Connected to the bases of these switching transistors 68, 70, 72 and 74 are a head transport motor control circuit 76 which functions to cause selective conduction through the transistors 68, 70, 72 and 74 and, in consequence, the selective energization of the head transport motor windings 60, 62, 64 and 66, thereby enabling the pair of transducer heads 20 and 22, FIG. 1, to access the individual tracks on the magnetic disk 12.

OPERATION

The FDD 10 can be set into operation as the unshown power switch of the complete data processing system, comprising the FDD 10 and host equipment 58, is closed, with the magnetic disk 12 mounted in position on the turntable 14 and caught between the pair of transducer heads 20 and 22. The closure of the power switch, however, does not result in power delivery to the disk drive motor 18, head transport motor 32, and read/write circuit 44 since these components of the FDD 10 are connected to the supply terminal 36 via the switching transistors 40 and 42.

The disk drive motor 18 can be set into rotation to drive the magnetic disk 12 only when, following the closure of the power switch, the first switching control circuit 54 of the host equipment 58 delivers a "motor on" signal to the base of the first switching transistor 40 to cause conduction therethrough. Because of the presence of the conduction retarding capacitor 52, however, the first switching transistor 40 does not conduct immediately, but gradually, in response to the "motor on" signal. Such gradual conduction of the first switching transistor 40 serves to minimize a current surge, and a resulting drop in supply voltage, due to the provision of the voltage regulating capacitor 46 of considerably large capacitance on the output side of the first switching transistor 40. Any abrupt voltage drop is objectionable, of course, as it would cause malfunctions in such terminal equipment as the CPU and display that are fed from the same power supply as the FDD 10.

The disk drive motor 18 is set into rotation with the turntable 14 and the magnetic disk 12 thereon upon conduction of the first switching transistor 40. In FDDs in general, the magnetic disk starts rotation with such a delay following the energization of the disk drive motor, for mechanical reasons, that the noted delay in the conduction of the first switching transistor 40 is negligible. Being connected to the first switching transistor 40 in this particular embodiment, the read/write circuit 44 is also fed therefrom with some delay following the delivery of the "motor on" signal to the first switching transistor. Such delayed power delivery to the read/write circuit 44 presents no problem at all because, as is usual with FDDs in general, data transfer between magnetic disk 12 and transducer heads 20 and 22 does not begin until the disk attains a normal speed of rotation.

The head transport motor 32 is fed from the supply terminal 35 upon conduction of the second switching transistor 42 in response to the output from the second switching control circuit 56. A current will flow through any of the four phase windings 60, 62, 64 and 66 upon conduction of the corresponding one of the switching transistors 68, 70, 72 and 74 as dictated by the head transport motor control circuit 76. Having no conduction retarder, the second switching transistor 42 conducts immediately in response to the output from the second switching control circuit 56 to allow immediate energization of the head transport motor windings 60, 62, 64 and 66. The pair of transducer heads 20 and 22 can therefore be quickly transported to a desired track on the magnetic disk 12.

We have gained the following advantages by this particular embodiment:
1. A quick commencement of data transfer is possible as power is fed to the disk drive motor 18 and head transport motor 32 from the supply terminal 36 via respective switching transistors 40 and 42 in a manner required by each motor.
2. The two switching transistors 40 and 42 make it possible to reduce power consumption by the motors 18 and 32 far more effectively than if both motors were simultaneously turned on and off by a common switch.
3. The two switching transistors 40 and 42 do not conduct at the same moment even when actuated simultaneously, because of the provision of the voltage regulating capacitor 46 and conduction retarder 52 to the first switching transistor 40, with a consequent reduction in the magnitude of the total starting current. The supply circuit connected to the supply terminal 36 can therefore be of correspondingly smaller capacity.

SECOND FORM

In an alternative embodiment of our invention shown in FIG. 3, the conduction retarder for the first switching transistor 40 takes the form of a time constant circuit 52a, instead of the capacitor 52 of the FIG. 2 embodiment. Connected between the base of the first switching transistor 40 and the first switching control circuit 54, the time constant circuit 52a functions to gradually increase the base current of the first switching transistor in response to the output from the first switching control circuit. The time constant circuit 52a thus serves to minimize a current surge due to the voltage regulating capacitor 46 connected to the line 48 between first switching transistor 40 and disk drive motor 18.

The alternative embodiment of FIG. 3 also differs from the FIG. 2 embodiment in having a second direct current supply terminal 78 of, say, five volts for the head transport motor 32. The second supply terminal 78 is connected via a reverse blocking diode 80 to the line 50 between second switching transistor 42 and head transport motor 32. As is well known, the head transport motor requires a relatively high supply voltage (12 volts) for transporting the transducer heads 20 and 22 from track to track on the magnetic disk 12 but can do with a lower supply voltage (five volts) for holding the heads on a desired track.

Thus, for saving power, the head transport motor 32 may be selectively fed from either the first supply terminal 36 or the second supply terminal 78. The selective power delivery to the head transport motor 32 is accomplished by the second switching transistor 42 in the FIG. 3 embodiment. A five volt supply voltage is applied from the second supply terminal 78 to the head transport motor 32 via the reverse blocking diode 80 during each nonconducting period of the second switching transistor 42, causing the motor to hold the transducer heads 20 and 22 on a desired track on the magnetic disk 12. Upon conduction of the second switching transistor 42, then, the reverse blocking diode 80 becomes reverse biased to electrically disconnect the second supply terminal 78 from the head transport motor 32; instead, a 12 volt supply voltage is impressed from the first supply terminal 36 to the motor via the second switching transistor. So energized, the head transport motor 76 can transport the transducer heads 20 and 22 from track to track on the magnetic disk 12.

The other details of construction of this alternative embodiment can be similar to those of the FIG. 2 embodiment. Its mode of operation is also considered self evident from the foregoing description of FIGS. 1 and 2.

Although we have shown and described our invention in terms of but two embodiments thereof, we recognize that our invention could be embodied in other forms to meet specific requirements of each application of the invention or simply to satisfy design preferences. A variety of modifications of the disclosed embodiments will also readily occur to one skilled in the art. For example, a capacitor might be connected as required to the output line 50 of the second switching transistor 42, provided that the sum of its capacitance and the stray capacitance between output line 50 and ground was less than the capacitance of the voltage regulating capacitor 46. It will also be seen that field effect transistors could be employed in place of he switching transistors 40 and 42. All these and other modifications, alterations and adaptations of our invention within the usual knowledge of the specialists are considered to fall within the scope of our invention.

We claim:
1. A data transfer apparatus for use with a disklike record medium such as a flexible magnetic disk having data storage tracks, comprising:
(a) a disk drive motor for imparting rotation to the record medium;
(b) a transducer head for data transfer with the record medium;
(c) a head transport motor for transporting the transducer head in a predetermined direction relative to the record medium so as to enable the transducer head to access the data storage tracks on the record medium;

(d) direct current power supply means;

(e) a first switching transistor connected between the power supply means and the disk drive motor for the on off control of power delivery from the former to the latter;

(f) a second switching transistor connected between the power supply means and the head transport motor for the on off control of power delivery from the former to the latter;

(g) a first switching control circuit for controlling the switching operation of the first switching transistor;

(h) a second switching control circuit for controlling the switching operation of the second switching transistor;

(i) a voltage regulating capacitor connected between ground and a line connecting the first switching transistor to the disk drive motor, the voltage regulating capacitor having a capacitance greater than the capacitance between ground and a line connecting the second switching transistor to the head transport motor; and (j) a conduction retarder connected to the first switching transistor for causing a gradual conduction therethrough in response to an output from the first switching control circuit.

2. A data transfer apparatus as set forth in claim 1, wherein the conduction retarder comprises a capacitor connected between the collector and base of the first switching transistor.

3. A data tranfer apparatus as set forth in claim 1, wherein the conduction retarder comprises a time constant circuit connected between the base of the first switching transistor and the first switching control circuit.

4. A data transfer apparatus as set forth in claim 1, further comprising:

(a) second direct current power supply means for supplying a direct current power of smaller magnitude than that supplied by the first recited direct current power supply means; and (b) a reverse blocking diode connected between the second power supply means and a line connecting the second switching transistor to the head transport motor.

5. A data transfer apparatus as set forth in claim 1, further comprising a read/write circuit connected to the power supply means via the first switching transistor.

* * * * *